United States Patent
An et al.

(10) Patent No.: US 6,715,073 B1
(45) Date of Patent: Mar. 30, 2004

(54) SECURE SERVER USING PUBLIC KEY REGISTRATION AND METHODS OF OPERATION

(75) Inventors: Larry An, Great Falls, VA (US); Hamid Bacha, Great Falls, VA (US); Robert Briggs, Burke, VA (US); Robert Burns, Pembroke Pines, FL (US); Robert B. Carroll, Mt. Kisco, NY (US); Mark Fisk, North Potomac, MD (US); Hatem Ghafir, Olney, MD (US); Raymond Good, Ashburn, VA (US); Srinivasa Kasturi, Annadale, VA (US); Ku Lee, Germantown, MD (US); Drew Kittel, Washington, DC (US); Lolo Lasida, Alexandria, VA (US); Hiroshi Maruyama, Tokyo (JP); Amit Pamecha, Fairfax, VA (US); Paresh Patel, Leicester (GB); Dieter Poetzschke, North Potomac, MD (US); Roger Reider, Silver Spring, MD (US); Khalid Asad, Frederick, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,766

(22) Filed: Dec. 31, 1998

Related U.S. Application Data

(60) Provisional application No. 60/087,974, filed on Jun. 4, 1998.

(51) Int. Cl.[7] .............................. H04L 9/00; H04L 9/30; G06F 11/30

(52) U.S. Cl. ........................ 713/156; 713/151; 713/152; 713/155; 713/193; 713/201; 380/30

(58) Field of Search ................................. 713/151–152, 713/155–156, 201, 193; 380/30

(56) References Cited

U.S. PATENT DOCUMENTS

| | | | | |
|---|---|---|---|---|
| 5,822,434 | A | * | 10/1998 | Caronni et al. ............. 713/163 |
| 6,105,013 | A | * | 8/2000 | Curry et al. ................ 713/155 |
| 6,105,131 | A | * | 8/2000 | Carroll ....................... 713/155 |
| 6,134,328 | A | * | 10/2000 | Cordery et al. ............ 713/155 |

* cited by examiner

*Primary Examiner*—Justin T. Darrow
*Assistant Examiner*—Kambiz Zand
(74) *Attorney, Agent, or Firm*—David M. Shofi

(57) ABSTRACT

A secure-end-to-end communication system for electronic business system and method of operation, e.g., the Internet, includes a web server—vault controller having personal storage vaults in the controller for users, registration and certification authorities. Each personal vault runs programs on the controller under a unique UNIX user ID. Data storage is provided by the controller wherein the storage is owned by the same user ID assigned to the vault. A registration authority running as a software application in the controller processes requests to issue, renew and revoke digital certificates issued by a certification authority using two pairs of public-private keys. The registration authority interacts with the vault controller to decide whether an applicant qualifies to receive a digital certificate. The certification authority running as software application in the controller includes a certificate management system that provides services such as issuing, revoking, suspending, resuming, and renewing a user's right to digital certificates.

23 Claims, 8 Drawing Sheets

HIGH-LEVEL ARCHITECTURE

LAUNCHING A VAULT PROCESS

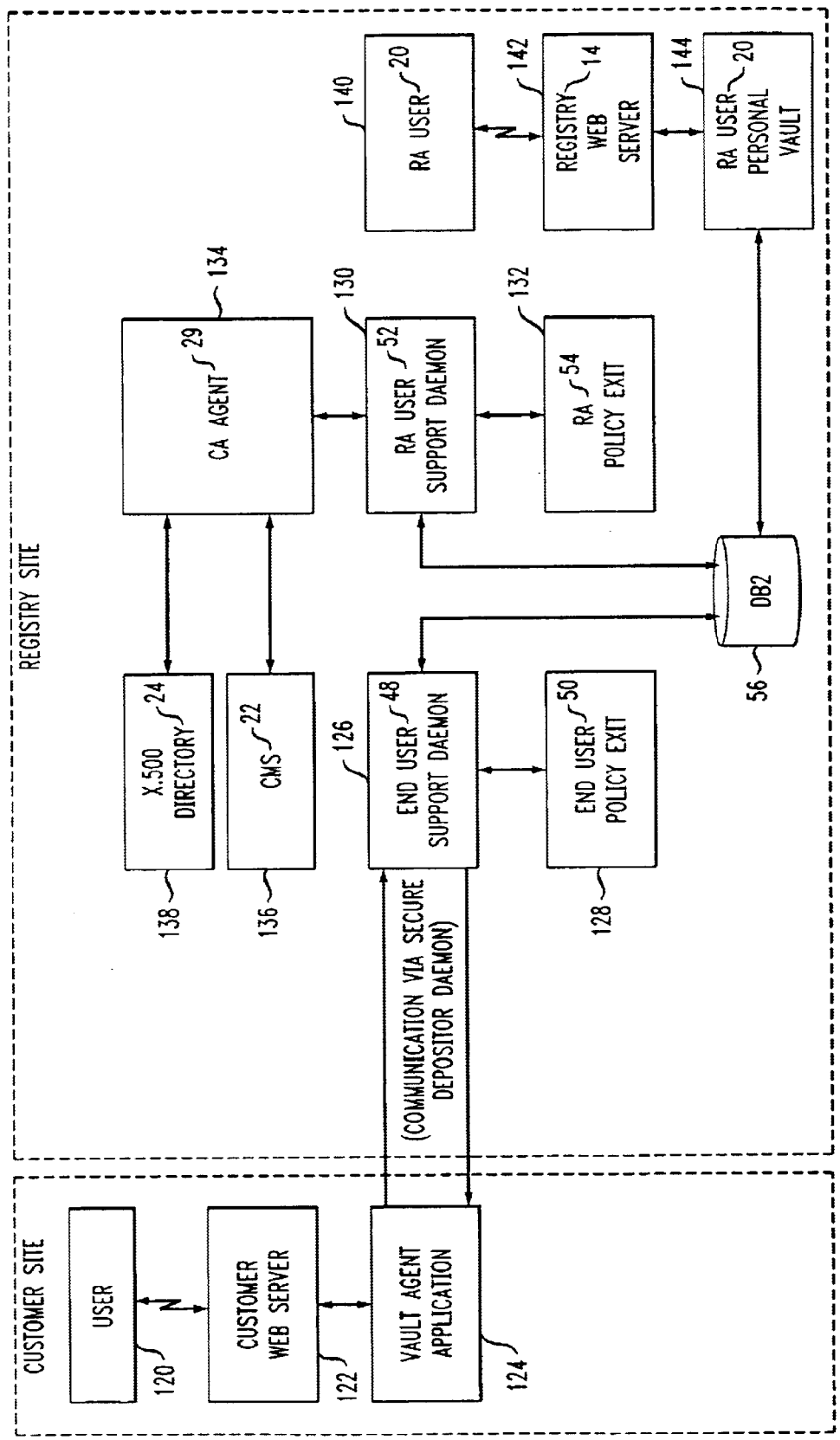

SECURE SERVER USING PUBLIC KEY REGISTRATION AND METHODS OF OPERATION

This application claims the benefit of the filing date of Provisional Application, Serial No. 60/087,974, filed Jun. 4, 1998, assigned to the same assignee as that of the present invention and fully incorporated herein by reference

CROSS-REFERENCE TO RELATED APPLICATION

This application is related to the following non-provisional, co-pending applications, all assigned to the same assignee as that of the present invention and fully incorporated herein by reference:

1. Ser. No. 08/980,022 entitled "Secure Server and Method of Operation for A Distributed Information System", filed Nov. 26, 1997.

2. Ser. No. 09/223,765 filed Dec. 31, 1998 entitled "Vault Controller Supervisor and Method of Operation for Managing Multiple Independent Vault Processes & Browser Sessions for Users in an Electronic Business System".

3. Ser. No. 09/223,764 filed Dec. 31, 1998 entitled "A Secure Communication System and Method of Operation for Conducting Electronic Commerce Using Remote Vault Agents Interacting with Vault Controller."

4. Ser. No. 09/223,834 filed Dec. 31, 1998 entitled "Vault Controller Based Registration Authorities and End Users for Conducting Electronic Commerce in a Secure End-to-End Distributed Information System."

BACKGROUND OF THE INVENTION

1. Field of the Invention

This invention relates to secure end-to-end communication systems and methods of operation. More particularly, the invention relates to secure end-to-end communications for conducting electronic business in a distributed information system, e.g., the Internet.

2. Background Discussion

Traditionally, organizations, such as retailers, banks, insurance companies in conducting electronic business register their customers or users and control their access to business software applications with a user identification (user ID) and password. The user ID and password establish a user's identity for accessing secured information. The password is the "virtual key" that authenticates a user. However, a password does not provide the security needed for electronic business. Passwords have the following limitations:

(a) Can be compromised during log-on by on-lookers;
(b) Can be easily intercepted on the Internet if the transaction is not secured with a secure web protocol, such as secure sockets layer;
(c) authenticate a user to a host, but not a host to a user;
(d) Can be discovered using automated "trial and error" techniques;
(e) Do not protect transmitted information; and
(f) Do not ensure that access is limited to authorized entities and applications.

A new approach to conducting electronic business on the Internet is described in the cross-referenced application. In this approach, digital keys replaced user identification-password pairs. Public key cryptography uses mathematically related public-private key pairs. Only the private key can decrypt the information the public key has encrypted. The public key can be made available to any one. The private key is kept secret by the holder.

Just as digital keys are replacing user identification-password pairs in electronic business, digital signatures are replacing physical signatures. A digital signature is a coded message affixed to a document or data that helps guarantee the identity of the sender, thereby providing a greater level of security than a physical signature. A digital signature identifies the sender because only the sender's private key can create the signature. The key also helps ensure that the content of the signed message cannot be altered without the recipient being able to discover that the message has been altered.

Digital certificates are also replacing their physical counterpart—hard copy credentials—in electronic business. Digital certificates issued by a certification authority vouches for (or certifies) the key of an individual, software application, organization or business. The certificate performs a role similar to that of a driver's license or medical diploma—the certificate certifies that the bearer of the corresponding private key is authorized (by an organization) to conduct certain activities with that organization.

However, the life cycle of digital certificates is similar to that of the physical certificates. Digital certificates are issued after authorization in which a user is given the right to use a digital certificate for a classified amount of time. The certificate may be temporarily suspended when a user reports a lost certificate. The certificate may be resumed or revoked when the by the organization. Finally, digital certificates expire and for secure end-to-end communication in electronic business, the certificate must be validated to determine whether the certificate has expired, been revoked or suspended.

Digital certificates are issued through authorized registrars known as Registration Authorities (RAs). The authorities determine whether the applicant should be authorized to access secure applications or services and set in motion the processes to issue a certificate. A Certification Authority (CA) issues the digital certificate after approval by the Registration Authority. The certificate is a binding between a public key and an identity, e.g. a person, organization or computer device. The certitude includes a subject name; issuer name; public key; validity period; unique serial number; CA digital signature. The CA guarantees the authenticity of the certificate through its digital signature. The certificate may be revoked at any time. The serial numbers of revoked certificates are added to a Certification Revoked List (CRL) published in an X.500 Directory based on a standard defined by the International Telecommunications Union (ITU).

IBM "Vault" technology provides strong authentication of clients and servers using digital keys and digital certificates for conducting electronic business. "Vault" technology is described in the above cross-related application. Briefly stated, "Vault" technology provides a secure environment in a web server using a vault controller (hereinafter, web server-vault controller) for running a secure web-based registration process and enabling secure application. The controller provides security from other processes running on the same server and secure areas or personal storage vaults to which only the owner has a key. System operators, administrators, certificate authorities, registration authorities and others cannot get to stored information or secure processes in such personal vaults. Combined with a Secure Sockets Layer (SSL), the controller enables secure registration transactions that require multiple sessions using personal vaults. The personal vault is owned by a particular UNIX account that is linked to a user with a specific vault access certificate. The content of the vault is encrypted and contains an encryption key pair and signing key pair, both of which are password protected. Each vault has a unique distinguished name in an X.500 directory that provides storage for specific items essential to a Public Key Infrastructure (PKI) using digital certificates, certificate authorities, registration authorities, certificate management services, and distributed directory services used to verify the identity and authority of each party involved in any transaction over the internet. The common name portion of a distinguished name is based on a unique vault ID. In addition the controller provides a unique map between the vault ID (which identifies the UNIX user account and the user's home directory) and the vault access certificate which enables a user to access a vault process.

To handle the exploding growth in electronic business, a registration system and method are needed to provide a set of services to manage the issuance, renewal and revocation of digital certificates for web browsers and servers. Such services should employ web-based facilities for requesting, reviewing certificate applications, and installing certificates. All important user interfaces and business policy requirements of the services should be tailorable with minor screen editing or programming changes on behalf of the business. Finally, certificate requests and responses should be implemented via agents using "Vault" technology.

SUMMARY OF THE INVENTION

An object of the invention is a secure end-to-end communication system for conducting electronic business using vault technology.

Another object is a registration system and method using public keys for user authentication and registration in a secure end-to-end communications system for conducting electronic business.

Another object is a registration system and method which provides unique mapping between a personal vault and a user from serial numbers and a user's certificate for the vault.

Another object is a registration system using an automatically generated password for accessing the vaults obtained by signing a token based on a digital certificate's serial number.

Another object is a registration system in which information about personal vaults is stored in an X.500 directory.

Another object is a vault process, a specialized program running on a vault controller on behalf of each end user under a unique UNIX user ID associated with the end user.

Another object is a vault agent, which allows interaction with a non-web based vault controller.

Another object is a registration system in which a vault agent process, which runs outside the controller, allows a business organization to develop custom applications for obtaining certificates or approving registration requests.

Another object is a registration system and method including a vault controller having a supervisor that runs as part of a Hypertext Transaction Protocol (HTTP) Daemon and acts as a pass through between an end user and an application being run by the user in a personal vault.

Another object is a registration system and method in which all messages between vaults are digitally signed and encrypted.

Another object is a vault controller that provides multiple browser sessions for users within the same controller process.

Another object is a registration system and method which provides vault processes which remain active for long periods of time after a browser disconnects from the controller.

Another object is a registration system and method in which vault processes running in a vault controller are user mapped to a running vault process when a browser re-connects a user to the process.

Another object is a registration system and method including a vault controller having a dispatcher that handles browser requests from other vault processes or from within the vault process threads.

Another object is a registration system and method including a vault controller having variable data pools allowing multiple applications running in a vault to share data.

Another object in a registration system and method using a vault controller which provides secure communications between vault processes by sending messages from a vault process to a specific vault rather than directly to another vault process.

Another object is a secure depositor within the vault process which encrypts and sends a message from a sending process and inserts in the queue of another vault, after which the depositor decrypts and verifies the message for the receiving vault process.

These and other objects, features, and advantages are achieved in a secure-end-to-end communication system for electronic business system and method of operation, e.g., the internet, in which users interact with web server-vault controllers in a secure manner using a standard Internet Engineering Task force (IETE) cryptographic protocol; digital keys and digital certificates. The web server—vault controller provides personal storage in vaults in the controller for users, registration and certification authorities. Each personal vault runs programs on the controller under a unique UNIX user ID. Data storage is provided by the controller wherein the storage is owned by the same user ID assigned to the vault. A registration authority running as a software application in the controller processes requests to issue, renew and revoke digital certificates issued by a Certification authority. The certification authority running as software application in the controller includes a certificate management system that provides services such as issuing, revoking, suspending, resuming, and renewing a user's right to digital certificates. The system also supports and maintains Certificate Revocation Lists (CRLs) in an X.500 directory, which provides storage for the public keys; public key certificates and certificate revocation lists. A Registration Authority interacts with the vault controller to decide whether an applicant qualifies to receive a digital certificate. A registration application running outside of the controller includes the ability to use a web interface to handle requests and administer the application, obtain service certificates, customize certificates, obtain certificates with or without vaults, and implement custom security policy controls for business organizations. The RA application provides support for multiple registration authorities in a manual or automated approval process mode.

DESCRIPTION OF DRAWING

The invention will be further understood from the following detailed description of a preferred embodiment taken in conjunction with the appended drawing, in which:

FIG. 10 is a further representation of a vault agent registration application with the web server-controller of FIG. 4.

DESCRIPTION OF PREFERRED EMBODIMENT

Figure 1:
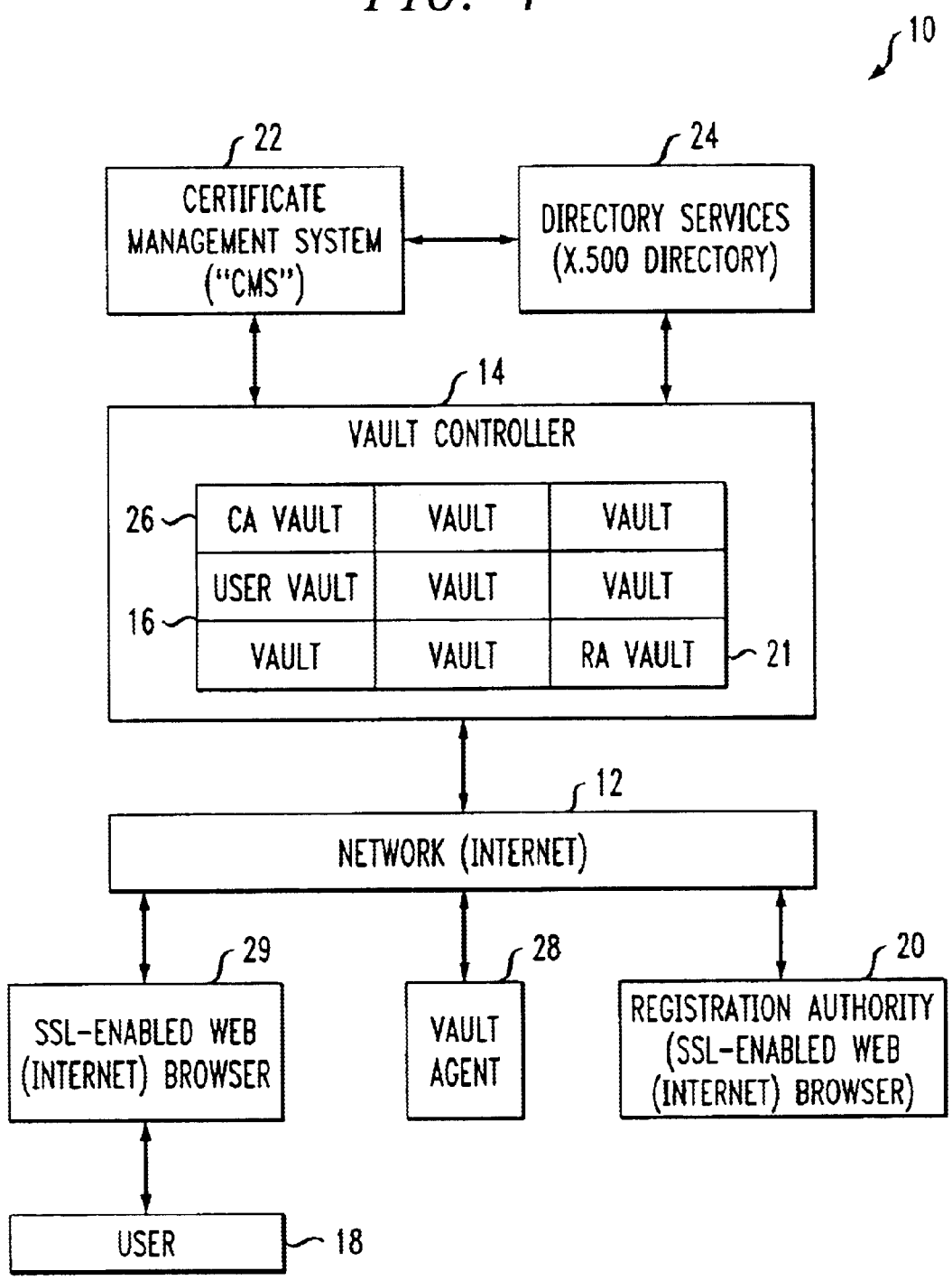
FIG. 1 is a representation of a secure end-to-end communication system using a web server-vault controller interacting with users and registration authorities and incorporating the principles of the present invention.

In FIG. 1, a secure-end-to-end communication system 10 for conducting electronic business in a distributed information system 12, e.g., the internet, includes an enhanced web server-vault controller 14 which provides processes and storage in personal vaults 16 for users 18, registration authorities 20, a certificate management system 22, and an X.500 directory 24. The system 22 and directory 24 are controlled by a certification agent (not shown) which operates in a CA vault 26, as will be described hereinafter. An external vault agent 28 is an optional lightweight vault process designed to run remotely at a customer's location. The agent incorporates a small subset of the vault process functionality. The subset enables the agent to exchange secure messages with vault processes running under the control of the vault controller. A controller 14, RA 20, and CA 26 communicate in a secure manner using a standard Internet Engineering Task Force (IETF) protocol, e.g., Secure Sockets Layer (SSL), developed by Netscape Communication Corporation, Mountain View, Calif. SSL provides secure communications by cryptographic algorithms including "RSA Public Key Encryption" and "Message Digest 5" (MD5), from RSA Data Security Incorporated. SSL supports higher level protocols including HTTP, FTP, and Telenet.

The vault controller 14 is an enhanced secure web server that provides personal vaults for users 18, RA's 20, and certification authorities. A personal vault in the controller provides a secure environment for executing programs and applications on behalf of a user. Personal vaults and their contents are accessible from SSL-enabled web browsers operated by the user and registration authority. Access to personal vaults does not require knowledge of a vault password and keys. Access to personal vaults requires a vault and key.

Information stored in personal vaults is protected against disclosure to unauthorized persons (such as System Administrators and other vault owners) by encryption; against tampering by digital signature; and against untrusted communications with unknown parties by authentication using digital certificates. Information can also be transmitted securely to other vaults using encryption, signing and certificates. Business organizations need such a high level security because their registration forms usually require customers to provide very sensitive information. The end user 18 uses an SSL-enabled web browser in a terminal 29 to conduct electronic business with an organization (not shown). The manner of conducting electronic business will be described in more detail hereinafter.

The registration authority 20 reviews each user registration request that is submitted; validates the request; and then approves or rejects the request. The registration decision is provided to the certification agent which uses the certificate management system 32 to issue, suspend, resume, renew or revoke X.509v3 certificates to users whose registration requests are approved. Additionally, the certificate certification authority publishes certificates, Certificate Revocation Lists (CRL), and policy information of organizations relative to electronic business in an X.500 directory 24. The X.509v3 certificates, CRL's, CA policies and other information about registered users and servers is stored in the X.500 Directory. An authorized user or software application can find a public key certificate for a particular person or server by searching the Directory for that person's or server's unique distinguishing name or other relevant information. The Distinguished Name (DN) is a unique name of a data entry stored in the X.500 Directory. The DN uniquely identifies the position of an entry in the hierarchical structure of the Directory.

Figure 2:
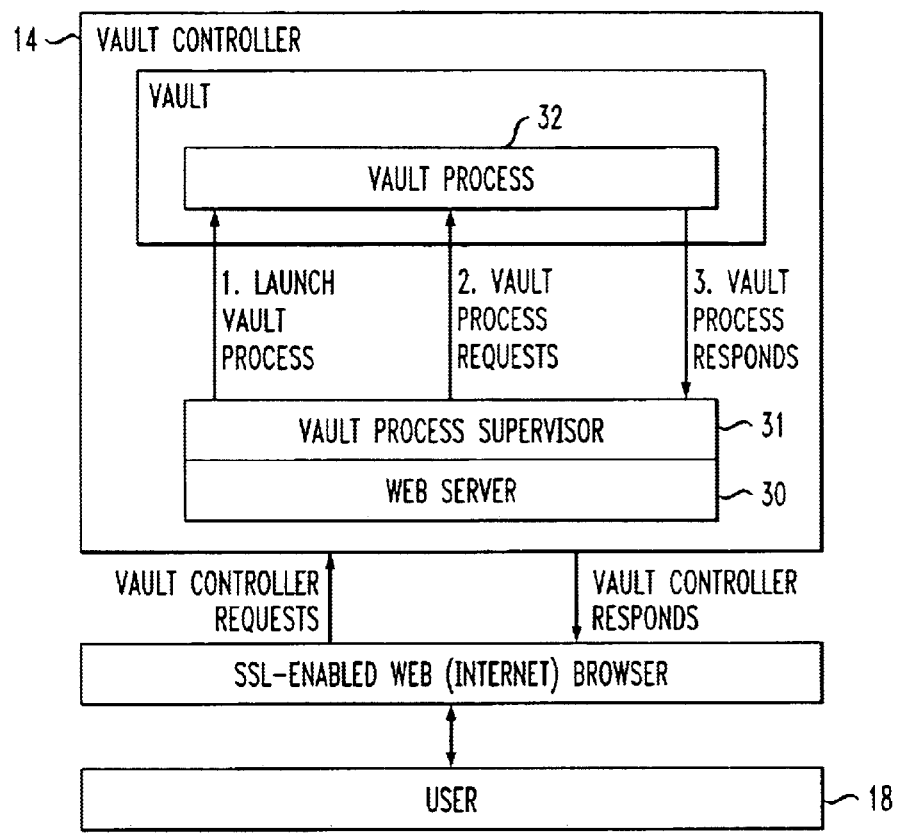
FIG. 2 is a representation of a user interacting with the vault controller of FIG. 1.

In FIG. 2, the vault controller 14 is the platform in which the certificate registration and administrative programs of a business organization run. The vault controller provides secure end-to-end communication using browser client authentication and SSL protocol. The browser request is encrypted and sent to the vault controller along with the vault access certificate. The controller consists of three major components. A web server 30, e.g., Lotus Domino Go web server; a vault process supervisor 31; and vault processes 32. The Lotus Domino Go web server is a secure scalable, high performance, transaction-ready web server that allows a web browser to interface with vault controller; allows a web browser to communicate securely with vault controller software via the SSL protocol; and authenticates a user's digital certificate and key.

The vault process supervisor validates and maps the vault access certificate to a user ID and password. A vault process is then launched on behalf of that user to handle the user's request. The vault process supervisor maintains a state table for determining whether a vault process is already running on behalf of the user. If a vault process is already running, the supervisor will attach the user to the existing vault process. The vault process shuts down after a predetermined period of inactivity, but until that period is reached, the process may be automatically activated when a user request is received.

Each vault process is multithreaded and able to handle multiple, simultaneous requests from the user. Additionally, each thread has its own local storage area allowing it to maintain "state" across multiple browser-server interactions.

Entries in the X.500 Directory and the certificates in the vault enable users to encrypt and sign data (through the secure depositor) for any other user on the system that has a vault. This information is safely encrypted in the public key of the recipient.

A Secure Depositor Daemon handles communications between remote vaults. For example, the Daemon receives messages from remote vault processes and then deposits them in the local vaults of vault agents. The Daemon 42 (See FIG. 4) runs independently of the vault agent or vault process and can simultaneously service multiple vaults.

The process supervisor 31 runs on the controller and manages all the vault processes the processes that run in personal vaults. The vault process supervisor maps users to an assigned vault; launches vault processes as needed; communicates information posted by a web browser to a vault process; and forwards vault process responses to the web browser.

A vault process 32 is a process running in a personal vault on the controller. The vault processes for authorized users of an organization's software applications run on behalf of the users in the vaults belong to the user. Likewise, vault processes for RA's run on behalf of the RA's in vaults that belong to the RA. A vault process is also used to communicate with the Certification Agent.

Figure 3:
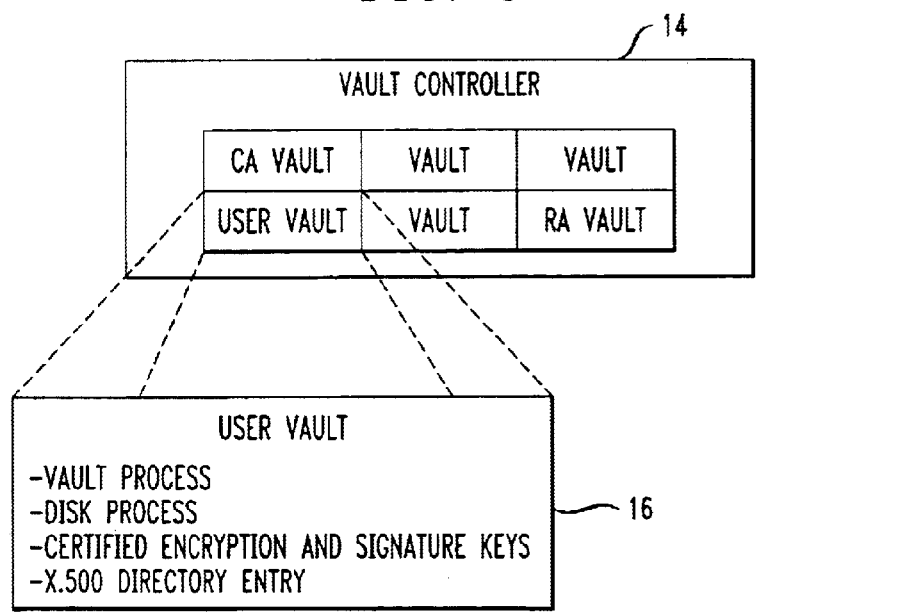
FIG. 3 is a representation of a personal vault included in the controller of FIG. 1.

FIG. 3 shows a personal vault 16 in the controller 14. Personal vaults serve multiple purposes in the controller. There are four types, as follows:

A user vault is a typical personal vault designed for use in the controller. A user (for example, a registration applicant or registration authority) accesses the vault through a web browser via a vault certificate. The vault certificate is issued during the registration process.

A certification agent vault 26 is a personal vault that is automatically created at installation. The sole purpose of this CA vault is to interact with a CMS. There is one CA vault per CMS. A CA agent is launched in the CA vault at system start up by the vault supervisor. The CA agent is a customized vault process that accepts RA requests for certificate management services and interacts with the CMS to implement them.

A validator vault 32 is a community vault that is automatically created when the controller is installed. The validator handles users who do not have a vault certificate as yet. A validator vault maps to a specific certification agent. A single validator vault process executes in the validator vault to process registration requests according to an organization's security policies (for example, pass a credit check or provide personal information). A RA Vault 21 serves the RA 20 described in FIG. 1.

Each personal vault provides a secure environment within the controller for executing programs on behalf of the user. Each personal vault consists of the following:

(1) A vault process runs on the controller on behalf of an owner. Each vault process runs under a unique UNIX user ID. The vault process can only be started by the vault process supervisor and only after a user presents a vault access certificate and key associated with that vault.

(2) The vault is owned by the same UNIX user ID that owns the vault process. Using the UNIX file permission scheme, only the user and system administrator have permission to access the disk storage. However, because user vaults are encrypted, the information within them is kept private from the system administrator.

(3) Each vault process has two key pairs, Each containing a certified public and a private key. One key pair is used for encryption and decryption. The other key pair is used for digital signing and signature verification. Routines for encryption and decryption, digital signing, and signature verification are accessible to processes running in personal vaults. Vault processes use a secure depositor to encrypt and sign data for secure interprocess communication with other vault processes and decrypt data and verified signatures for data received from other vault processes. The secure depositor (a component in the vault) encrypts and signs a message from a sending vault process and inserts in a queue of another vault. The depositor then decrypts and verifies a message for the receiving vault process.

(4) An X.500 Directory entry contains the personal vault's public key certificate and additional information. Other vault users use the public key and the certificate to encrypt data for the vault so that only the vault can access the information with a private key.

Figure 4:
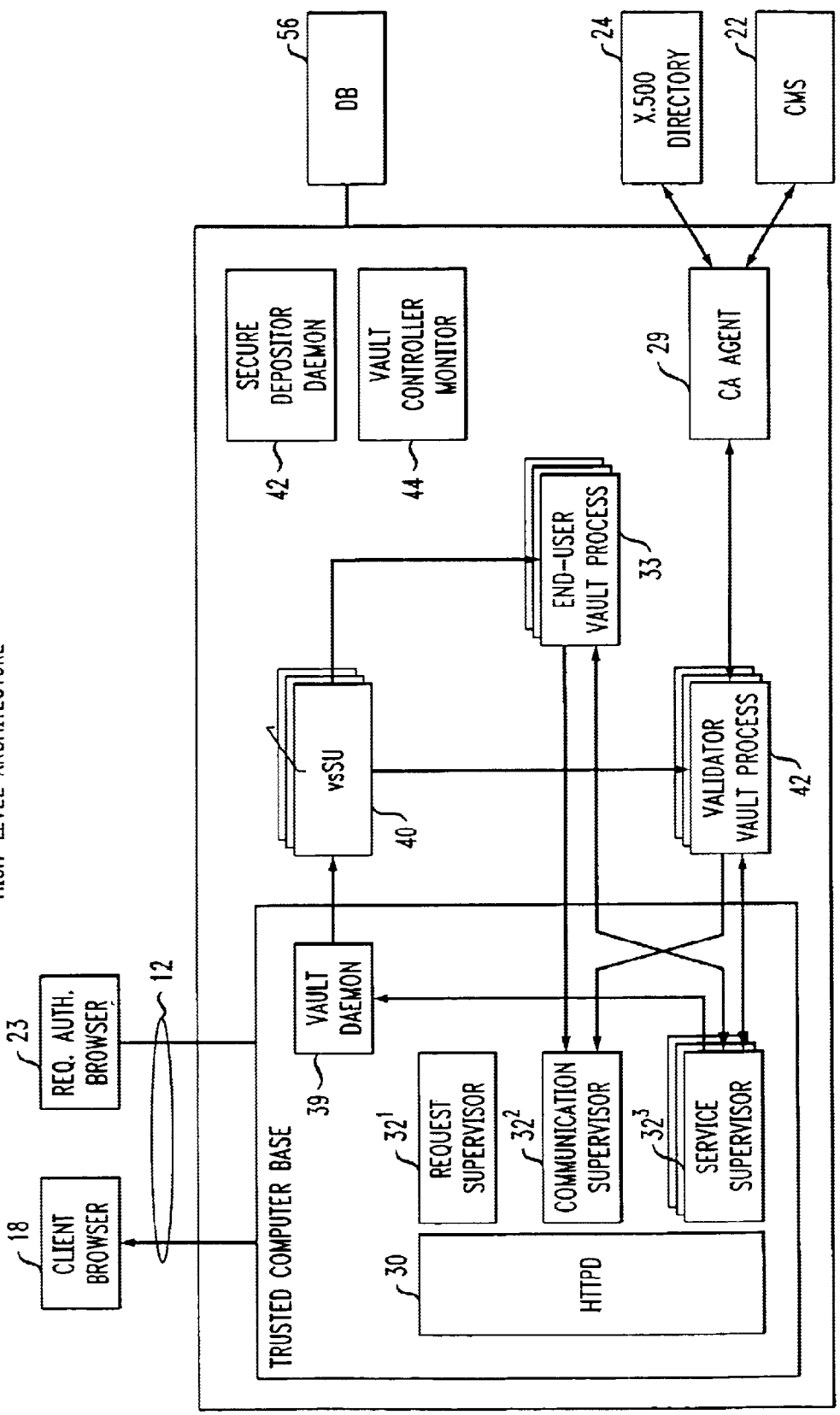
FIG. 4 is a high level architectural diagram of a web server-vault controller of the system of FIG. 1 interacting with client browsers and registration authority browsers for purposes of linking them thorough a communications supervisor to their respective vaults and processes for registrations and certification processes.

In FIG. 4, the controller is shown in further detail. The web server 30 is linked to client browser 18 and registration authority browsers 23 via a distributed network 12, e.g., the Internet using SSL protocols. The server 30 interacts with the supervisor which includes a request supervisor $32^1$, a communication supervisor $32^2$, and service supervisor $32^3$ where each service supervisor provides a different service for the vaults.

In FIG. 4, the request supervisor interacts with a validator vault process 37, which allows users to connect to the controller to apply for a vault access certificate, or at a later date to renew an expiring certificate. The request supervisor also interacts with a vault Daemon 39 that is a persistent process, which accepts requests from the supervisor to start vault processes. The vault Daemon launches an HTTP Daemon at system start up.

The communications supervisor interacts with the vault processes 33, which are programs that run in a user personal vault on behalf of the end user. The supervisor 32 also interacts with a first time vault process daemon 40 for a user.

Continuing with FIG. 4, the service supervisor interacts with the vault Daemon 31 to activate a user process 33 upon request from the supervisor $32^1$ via the vault daemon 40. The service supervisor also interacts with a validator vault process 42 to allow users to connect to the vault controller to apply for a vault access certificate, or at a later date, to renew an expiring certificate.

The validator vault process interacts with the certificate authority agent 29 to provide certification of a user after approval by a registration authority. The agent 29 interacts with the certificate management system 22 and 24. The Certificate Management System (CMS) 22 is a self-contained software application that manages digital certificates. The application provides services such as issuing, revoking, suspending, resuming, and renewing rights to the use of digital certificates. The application also supports maintenance of a Certificate Revocation List. In one embodiment, the CMS is manufactured and sold by Entrust, Ottawa, Canada.

The X.500 Directory 24 is based on the International Telecommunications Union's recommendation for a global directory of information for communications (e-mail, crypto exchanges, and telephone). The Directory provides storage for specific items essential to Public Key Infrastructure (PKI) including Public Key Certificates; Certificate Revocation Lists; Disclosure statements with respect to Certificate Authorities and Repositories; and Access Guidelines, Policies and Fees. The Directory is physically distributed across multiple systems with different organizations or countries owning and managing different parts. Data in the Directory is organized hierarchically in a tree, with the top of the tree being the root. No entries are allowed into the root directory. Often, high level organizations represent individual countries, governments, or companies. Users and devices are typically represented as leaves of each tree. These user organizations, localities, countries and devices, each have their own entry in the Directory information tree. Each entry in the tree consists of a number of typed attributes that provide information about the object represented by the entry. The CMS and X.500 directory are outside the controller along with a database server 56 which interacts with the vaults as described in FIG. 6, hereinafter.

A Secure Depositor Daemon 42 is a program that relays messages between processes running in vaults on separate physical machines. The Daemon is usually used for communication between vault agent applications running on a machine other than the vault controller and the vault processes running on the vault controller machine. The Daemon receives messages from remote vaults and inserts them in the queues of the destination of the local vaults.

A vault controller monitor 44 is a utility for running in the controller for starting system processes including long-running vault processes; starting new processes while the monitor is running and having the new processes monitored, and stopping processes that are being monitored. The utility provides automatic re-start when a process stops.

Figure 5:
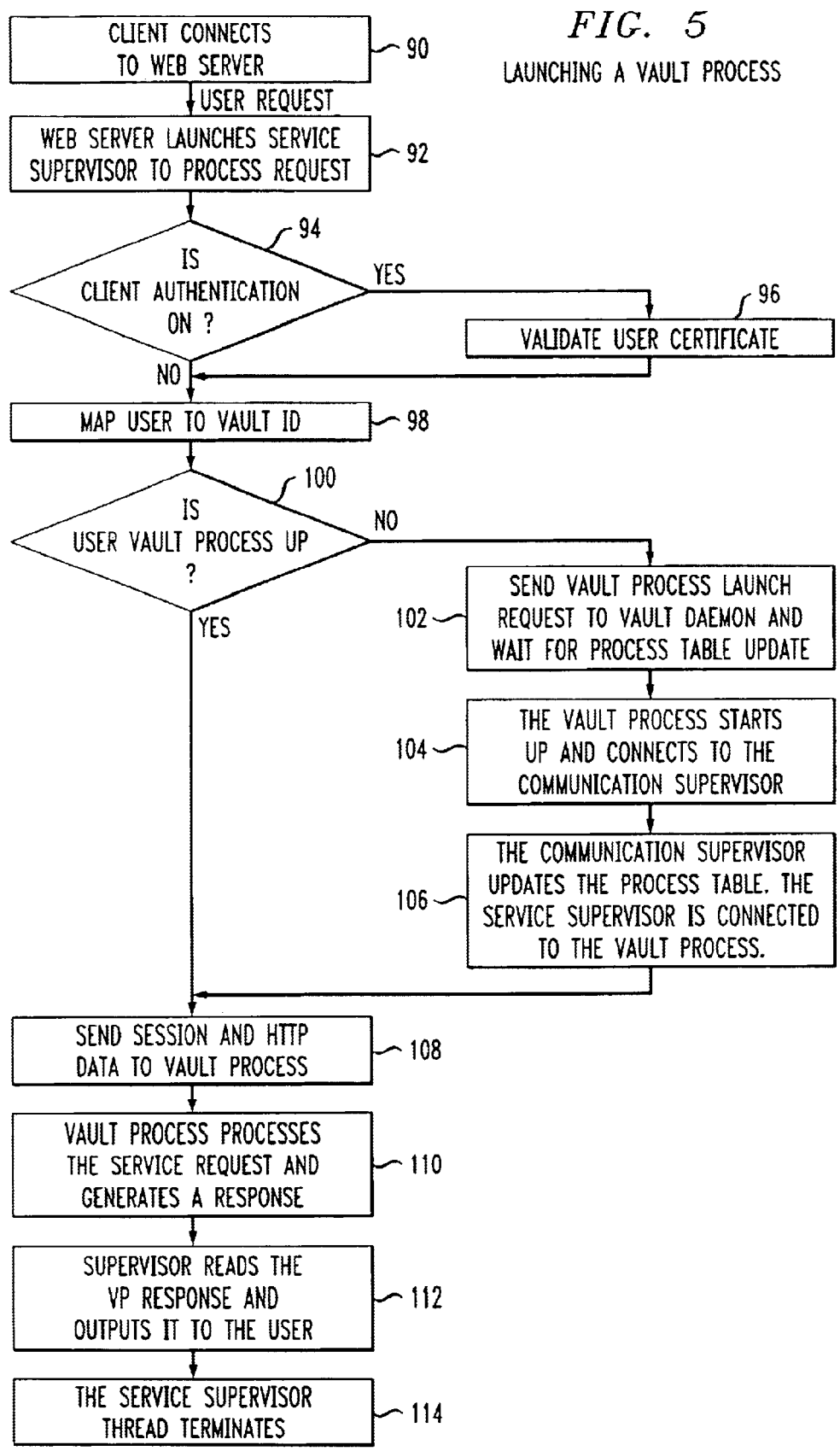
FIG. 5 is a flow diagram of launching a vault process for an end user or registration authority or certificate authority in web server-vault controller of FIG. 4.

Turning to FIG. 5, the process of launching a vault process begins in a step 90 in which a client connects to a web server, submitting a user request through the server which causes a service supervisor to process the request in a step 92. A test 94 is performed to determine if the client authentication is on. A "yes" condition initiates a step 96 to validate the user access certificate, after which the process moves to step 96 in which the user certificate is mapped to a vault ID in step 98. Previously, a "no" condition for test 90 would move the process to step 98 for the same purpose. After the user has been mapped to a vault ID, a test 100 is done to determine if the user vault process is up. A "no" condition initiates a step 102 to send the vault launch process to the vault Daemon and wait for a process update. The vault process starts up and connects to communication supervisor in a step 104. The communication supervisor updates the process table and the service supervisor is connected to the vault process in a step 106 after which the process moves to step 108. Previously, a "yes" condition for the test 100 moves process to step 108 in which the session and HTTP data is sent to the vault process now up and running. In a step 110, the vault process processes the service request and generates a response. The supervisor reads the vault process response and now outputs it to the user in a step 112, after which the service supervisor terminates in a step 114 and the process returns to step 92.

Figure 6:
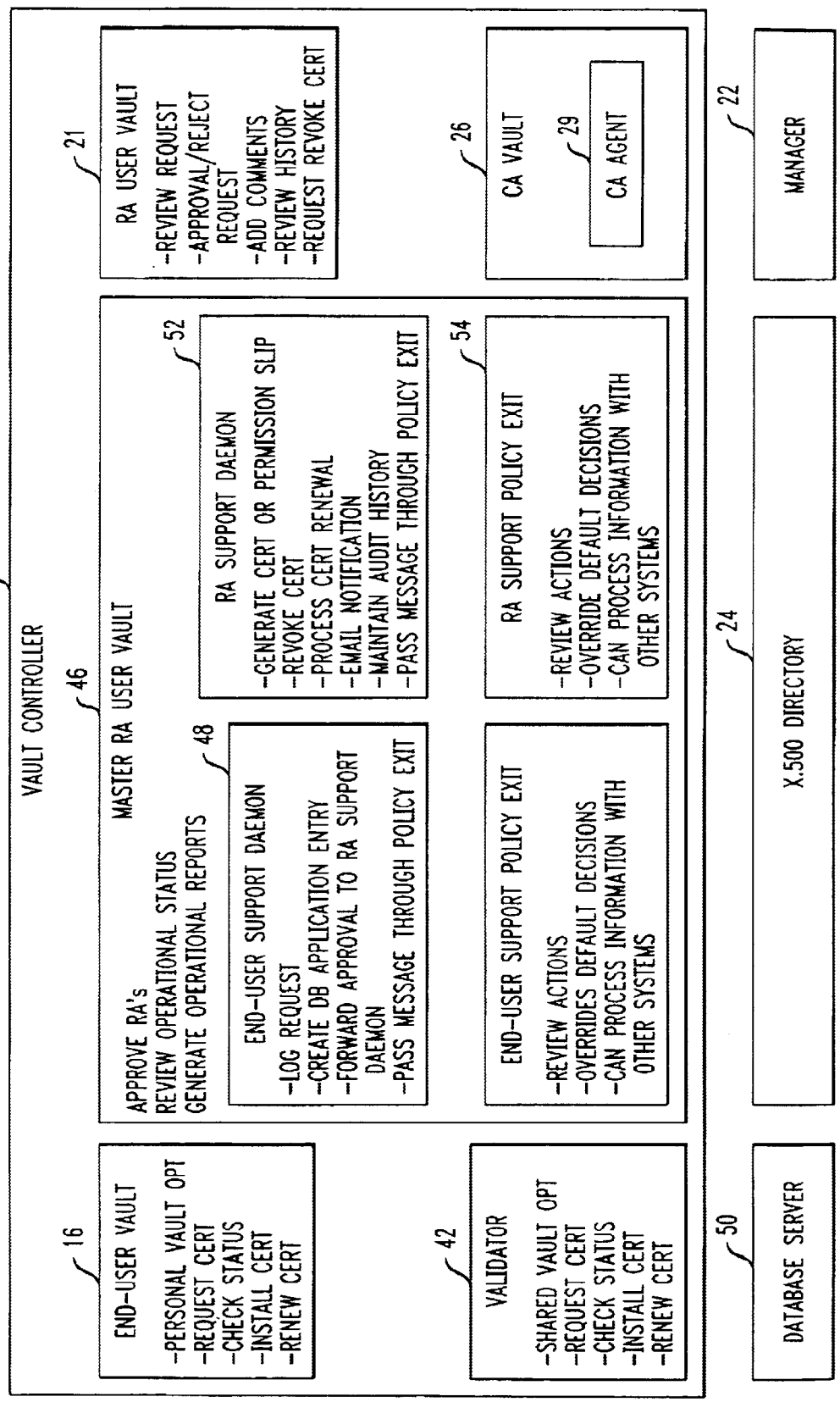
FIG. 6 is a representation of vault processes available in the web server-vault controller of FIG. 4 for Registration and used by a Master Registration Authority; an individual Registration Authority; an end user vault for personal vault operation and shared vault operation and a vault agent.

In FIG. 6, a registration process is supported by programs available in the vaults of an end user and a registration authority. The end user vault 16 is for personal vault operation and validator 42 is used in shared vault operation. Users can go through personal vault or a validator. Both end user and validator vaults can be used to check status, user certification using different options. The CMS services include requesting certification, checking status, installing certification and renewing certification for an origination CA. For validation vault operation similar functions are performed for a CA. The RA vault 21 includes capabilities for reviewing requests; approving/rejecting requests; adding comments; reviewing history and requesting revoked certification.

A Master Registration Authority Vault 46 serves all registration authorities within a given domain. The Master RA reviews operational status and generates operational reports. Either end user vault or validator (shared vault) operation may be used to request CMS service. For both the end user and the registration authority, an end user support Daemon 48 logs requests; creates data base application entries; forwards approvals to registration authorities support Daemon and pass messages through an organization's policy requirements as an exit point.

An end user supports policy exit 50 implements an organization's specific business policies regarding and conducting electronic business with an applicant. As such, policy exit 50 reviews actions taken by the applicant; overrides default decisions; and processes information with other systems.

An RA support Daemon 52 generates certification or permission slips for users, revokes certification, processes certification renewal; provides e-mail notification; maintains audit history; and passes messages through an RA policy support exit 54. The support policy exit processes 54 review actions of the RA; overrides default decisions; and processes information to other systems.

The Master RA User Vault; the RA User Vault; and the End User Vault interact with a database server 56; the X.500 Directory and the CMS Manager 22, all of which are outside of the controller and link through SSL protocol.

The controller 14 also includes a Certification Agent Vault 58 for servicing the CA agent 28 as will be described hereinafter.

Figure 7:
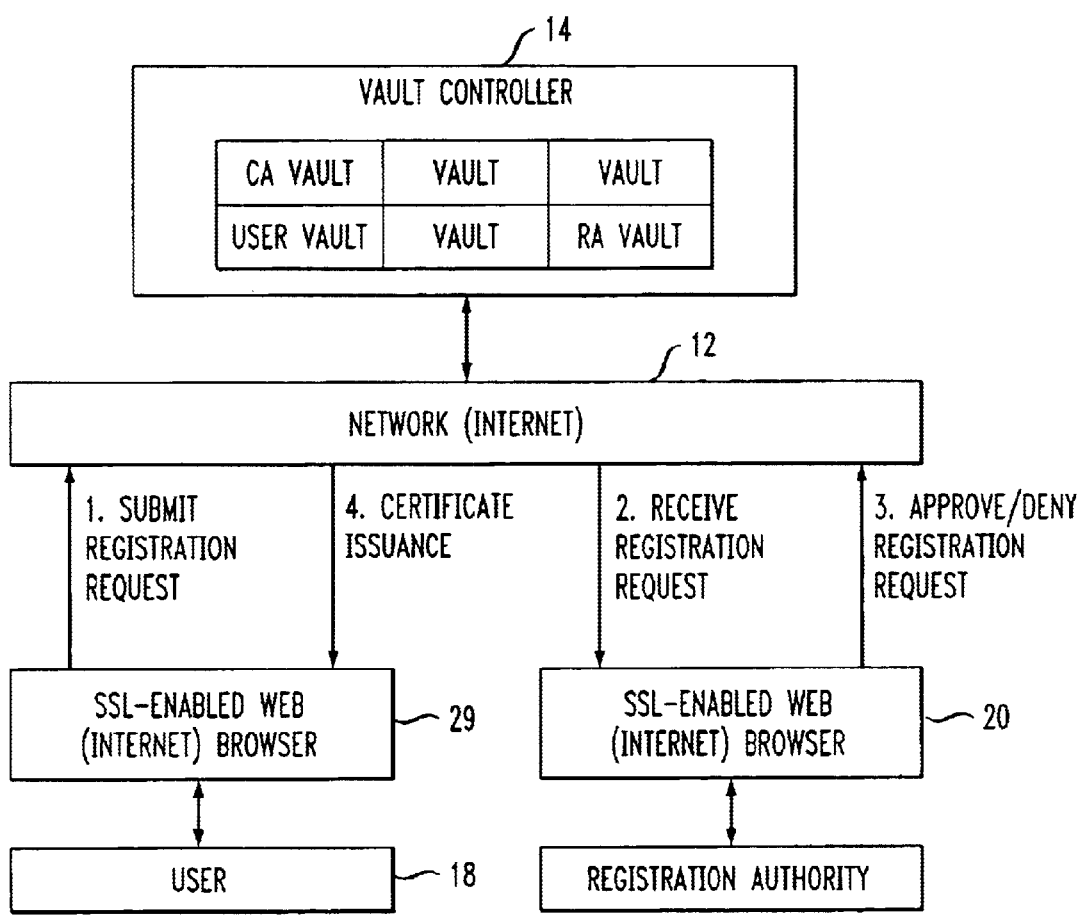
FIG. 7 is a representation of an applicant interacting with a Registration Authority for registration purposes using the vaults of FIG. 6.

In FIG. 7, a typical registration process consists of the following steps:

1. Applicant submits registration requests.

2. Using an SSL-enabled web browser that supports browser certificates and a vault registration application customized for a business application, an applicants fills in and submits the registration form. The form is transmitted by way of SSL protocol to the vault controller for processing by a Registration Authority for the business organization with which the applicant desires to conduct business.

3. RA receives and reviews registration request.

The RA reviews an applicant's pending Registration Request using a web browser that supports client's certificates. Only the RA and the applicant are able to view these requests. The sensitive information provided by the applicant is kept private and secure throughout the registration process.

4. The RA reviews each registration request. As part of the review, the RA may need to perform additional verification of the applicant's request as determined by the business organization's policy. The additional verification may be done in many ways. For example, the RA can contact the applicant to ensure that the applicant (not someone else) submitted a registration request. The RA can validate the request by viewing information in the registration form known only to the applicant and to the RA. Whatever the method, the business organization has total control of the registration approval process for the applicant.

5. RA approves registration request.

Using the business organizations' registration application, the RA indicates whether an applicant's registration should be approved or rejected. A Certificate Authority then signs the certificate.

6. Certificate is issued to the applicant.

The applicant checks whether the registration request has been approved. If approved, the applicant generates a public-private key pair and sends the public key to the CA, which digitally refigures the public key creating a certification for use in the business organization's software application. After approval of an applicant, the Certification Authority issues a vault access certificate and key pair, which provides access to the applicant's vault. The certificate is usually stored in a web browser and used to authenticate the applicant when establishing an SSL connection between a web browser and a vault controller. An organization's certificate and key pair provide an applicant with secure access to an organization's application and services. The certificate is generated by an organization's CA and approved by an organization's RA. The business organization controls the issuance, security policy and revocation of these certificates. An organization's certificate can be used in different ways depending on the location of the secure software application.

7. Information is encrypted at all times.

Throughout the registration process, the information provided by the applicant and stored in the database 56 (see FIG. 6) and transmitted between processors in encrypted form.

8. Certificates are continually managed.

The RA provides on-going administration of all certificates throughout their life cycle.

When secure applications are located on a web server hosted by the business organization that is not a vault controller, the business organization's certificate is used to authenticate to the web server using SSL. Without the certificate, access to the web server is denied.

When secure applications are located on a vault controller, the vault certificate can be used to access a secure software application running in an applicant's personal vault. Without this certificate, access to the application is denied.

An encryption certificate is associated with a personal vault for certifying the encryption key used in the vault.

A signature certificate is associated with a personal vault certifying the signature key used in the vault.

The encryption certificate, signing certificate, and the related key pairs are used by the vault controller applications on behalf of the user. The controller builds upon CMS technology to provide customers with keys and certificates that are needed for all applications in multiple environments.

Figure 8:
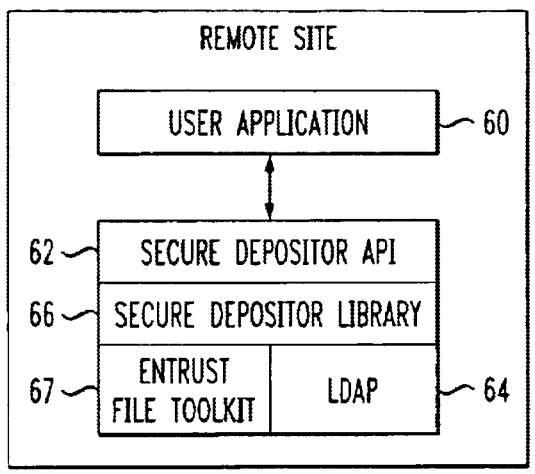
FIG. 8 is a representation of an application structure for a vault agent shown in FIG. 1.

Now turning to FIG. 8, a vault agent is a lightweight vault process running in remotely at a customer's location. The vault agent incorporates a small set of the vault process functionality to provide non-web-based interaction with the vault controller. This subset enables the vault agent to exchange secure messages with vault processes running under the control of the vault controller while a web browser provides an interactive Graphical User Interface (GUI) base to the vault controller, the vault agent provides a programmable interface. In FIG. 8, a business organization's custom application 60 sits directly atop a secure depositor interface 62. The interface uses a lightweight directory advertising protocol 64, which is used to access X.500 Directories. The interface also uses protocols 64 and both the Secure Depositor Library and took kit 67 to perform encryption, decryption, signing and verification functions. The keys these functions used are located (in encrypted form) in the Vault Agent Vault.

The main function of a vault agent is to send messages to and receive messages from, vault processes running on the vault controller. Messages are signed and encrypted before transmission. A TCP/IP socket connection is used to transmit messages from the secure depositor process to a secure depositor Daemon running in the vault controller.

The secure depositor takes a distinguished name of a target vault owner to access the appropriate record from an X.500 Directory and extracts attributes relating to the vault owner; vault ID; vault path; vault IP address; and vault encryption level.

The secure depositor uses a mapping algorithm to map to a vault ID. The vault ID is concatenated with a search base to form a complete distinguished name for the vault. This methodology facilitates the detection of any modification or replacement of the information used to map to the target vault. When the secure depositor retrieves the signed message from the user DN record, the depositor extracts the vault name from the signed message. After which, the depositor extracts the encryption certificate from the vault DN record and encrypts the message to the target vault. Combining the vault owner DN and the vault name in the signed message provides two benefits. The first benefit is that the secure depositor can verify that the vault name is actually bound to the user DN and this binding has not been modified. The second benefit is that if someone has replaced the signed message in the user DN record with that from another record, the user DN of the signed message will not match the DN in the X.500 Directory record. The secure depositor will then reject the encryption attempt.

Figure 9:
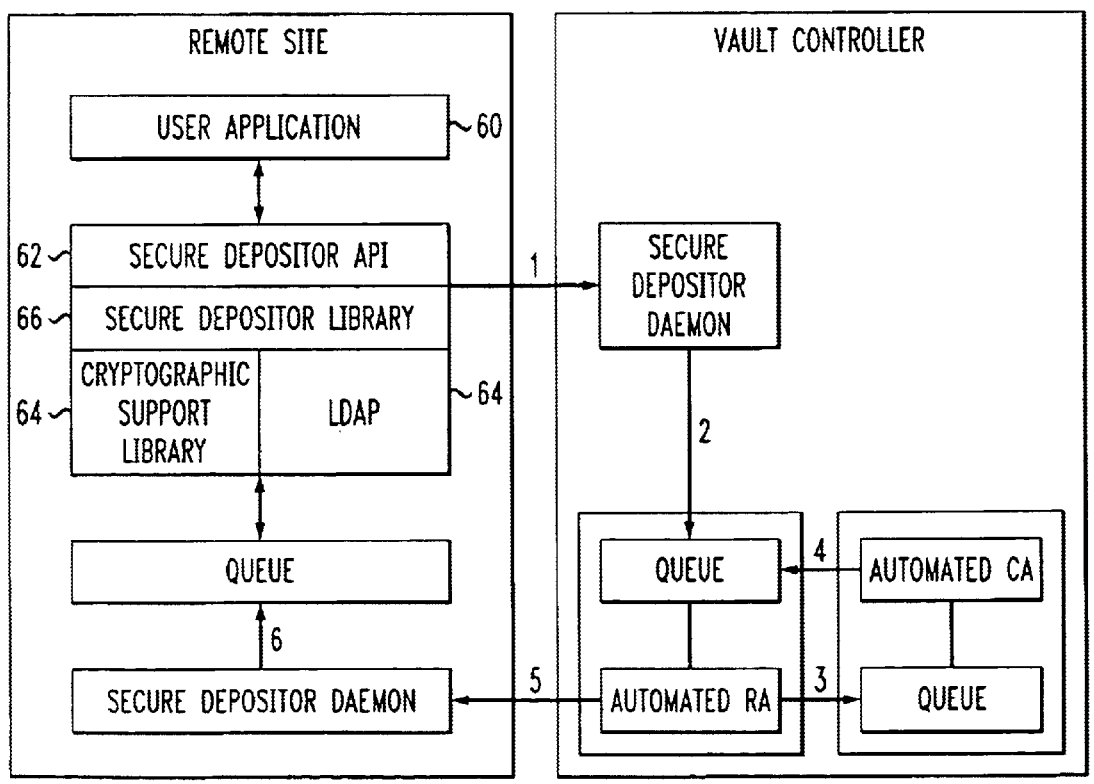
FIG. 9 is a representation of interaction of a vault agent registration application in the system of FIGS. 1 and 4.

In FIG. 9, the interaction between a vault agent and a vault process running in the controller begins in steps 1 and 2 in which the vault agent sends a request to an automated RA to issue a certificate. In step 3, the automated RA forwards the request to the CA agent. In step 4, the CA's agent signs the certificate—through the CA, and returns the certificate to the automated RA. In steps 5 and 6, the automated RA sends a certificate back to the remote agent. The remote agent then delivers the certificate to the appropriate user.

The interaction of a vault agent serving a user and interacting with the controller is further shown in FIG. 10 and begins with a user in a step 120 sending a request to a customer web server, whereupon the customer web server in a step 122 forwards the request to a vault agent connected to a common gateway interface. The vault agent in a step 124 communicates with the secure deposit Daemon to contact the end user support Daemon 48 (see FIG. 6) to log the request and perform the other functions previously described, in a step 126. As a part of the process, the support Daemon 48 interacts with the end user policy exit 50 to apply the latest business policies to the transaction in a step 128. The support Daemon also interacts with the database 56 in completing the application process. The RA user support Daemon 52 searches the database 56 and initiates the registration process in a step 130. In processing the request, the RA exercises the RA policy exit 54 in a step 132. As a part of processing the application, the RA user support Daemon interacts with the certification agent in a step 134 initiating the agent to interact with the CMS 22 in a step 136 and the X.500 Directory 24 in a step 138.

A registration authority looking to check the status of a user communicates with the controller in a step 140 to review the status of an end user. The web server 14 in a step 142 interacts with the RA user's personal vault 20-1 in a step 144 using the database 56 to provide the RA 20 with the information necessary to determine whether an certificate should be continued, revoked, or modified as the case may be.

While the invention has been described in a preferred embodiment, various changes may be made therein with out departing from the spirit and scope of the invention as defined in the appended claims.

We claim:

1. Apparatus for use in establishing a secure exchange of information between an end user and a server in a distributed network environment, the apparatus comprising:

a network-based controller associated with the server and operative to: (i) control one or more secure areas accessible by one or more authenticated entities for storing data and for executing one or more processes;

(ii) interact with a registration authority, via one of the secure areas, for registering to obtain certification information for use by the end user in establishing a secure exchange of information between the end user and the server, wherein the secure area through which the controller and the registration authority interact is operative to execute a registration process for use in registering the end user to obtain the certification information; and (iii) interact with a certification authority, via one of the secure areas, for obtaining the certification information, wherein the secure area through which the controller and the certification authority interact is operative to execute a certification process for use in at least one of issuing, renewing and revoking the certification information.

2. The apparatus of claim 1, wherein the controller is further operative to interact with a directory to obtain information for use in accordance with accessing the one or more secure areas.

3. The apparatus of claim 1, wherein the certification information comprises a digital certificate.

4. The apparatus of claim 1, wherein at least a portion of the secure areas comprise user secure areas for storing user data and executing user processes.

5. The apparatus of claim 1, wherein the controller is further operative to interact with an agent remote from the controller, the remote agent being enabled to execute a certification information process independent of the server.

6. The apparatus of claim 1, wherein the controller is further operative to map a secure area and a user when a user identifier and a digital certificate are presented.

7. The apparatus of claim 1, wherein the controller is further operative to exchange one or more messages between one or more secure areas and at least one of the certification authority and the registration authority, wherein the one or more messages are one of encrypted and digitally signed.

8. The apparatus of claim 1, wherein the controller is further operative to interact with the end user via a network browser.

9. The apparatus of claim 8, wherein the certification information is stored in association with the network browser for use in authenticating the end user when establishing the secure exchange of information between the end user and the server.

10. The apparatus of claim 1, wherein the one or more secure areas comprise one or more vaults.

11. The apparatus of claim 1, wherein a secure area executes a process therein under a unique user identifier.

12. A method for use in establishing a secure exchange of information between an end user and a server in a distributed network environment, the method comprising the steps of:

in accordance with a network-based controller associated with the server, the controller;

controlling one or more secure areas accessible by one or more authenticated entities for storing data and for executing one or more processes;

interacting with a registration authority, via one of the secure areas, for registering to obtain certification information for use by the end user in establishing a secure exchange of information between the end user and the server, wherein the secure area through which the controller and the registration authority interact is operative to execute a registration process for use in registering the end user to obtain the certification information; and interacting with a certification authority, via one of the secure areas, for obtaining the certification information, wherein the secure area through which the controller and the certification authority interact is operative to execute a certification process for use in at least one of issuing, renewing and revoking the certification information.

13. The method of claim 12, wherein the controller interacts with a directory to obtain information for use in accordance with accessing the one or more secure areas.

14. The method of claim 12, wherein the certification information comprises a digital certificate.

15. The method of claim 12, wherein at least a portion of the secure areas comprise user secure areas for storing user data and executing user processes.

16. The method of claim 12, wherein the controller interacts with an agent remote from the controller, the remote agent being enabled to execute a certification information process independent of the server.

17. The method of claim 12, wherein the controller maps a secure area and a user when a user identifier and a digital certificate are presented.

18. The method of claim 12, wherein the controller exchanges one or more messages between one or more secure areas and at least one of the certification authority and the registration authority, wherein the one or more messages are one of encrypted and digitally signed.

19. The method of claim 12, wherein the controller interacts with the end user via a network browser.

20. The method of claim 19, wherein the certification information is stored in association with the network browser for use in authenticating the end user when establishing the secure exchange of information between the end user and the server.

21. The method of claim 12, wherein the one or more secure areas comprise one or more vaults.

22. The method of claim 12, wherein a secure area executes a process therein under a unique user identifier.

23. An article of manufacture for use in establishing a secure exchange of information between an end user and a server in a distributed network environment, comprising a machine readable medium containing one or more programs which when executed implement the steps of:

in accordance with a network-based controller associated with the server, the controller:

controlling one or more secure areas accessible by one or more authenticated entities for storing data and for executing one or more processes;

interacting with a registration authority, via one of the secure areas, for registering to obtain certification information for use by the end user in establishing a secure exchange of information between the end user and the server, wherein the secure area through which the controller and the registration authority interact is operative to execute a registration process for use in registering the end user to obtain the certification information; and interacting with a certification authority, via one of the secure areas, for obtaining the certification information, wherein the secure area through which the controller and the certification authority interact is operative to execute a certification process for use in at least one of issuing, renewing and revoking the certification information.

* * * * *

UNITED STATES PATENT AND TRADEMARK OFFICE
CERTIFICATE OF CORRECTION

PATENT NO. : 6,715,073 B1
DATED : March 30, 2004
INVENTOR(S) : L. An et al.

It is certified that error appears in the above-identified patent and that said Letters Patent is hereby corrected as shown below:

Title page,
Item [56], References Cited, U.S. PATENT DOCUMENTS, incorporate the following patents:

| | | | | |
|---|---|---|---|---|
| -- 5,996,076 | * | 11/1999 | Rowney et al. | 713/201 |
| 6,035,402 | * | 3/2000 | Vaeth et al. | 713/201 |
| 6,308,277 | * | 10/2001 | Vaeth et al. | 713/201 -- |

Signed and Sealed this

Thirteenth Day of July, 2004

JON W. DUDAS
*Acting Director of the United States Patent and Trademark Office*